United States Patent [19]
Yeom et al.

[11] Patent Number: 5,336,289
[45] Date of Patent: Aug. 9, 1994

[54] APPARATUS FOR SHEARING A GOB

[75] Inventors: Hancheol Yeom; Hoseong Lee; Yucheol Jeong; Hoyoung An; Juho Choi; Wonbo Lee, all of Kyungki, Rep. of Korea

[73] Assignee: Samsung Corning Co., Ltd., Rep. of Korea

[21] Appl. No.: 65,219

[22] Filed: May 19, 1993

[30] Foreign Application Priority Data

May 20, 1992 [KR] Rep. of Korea ............... 92-8581

[51] Int. Cl.⁵ .................................... C03B 11/00
[52] U.S. Cl. ................................ 65/334; 65/133; 83/623; 83/698.11
[58] Field of Search ................. 65/133, 207, 334; 83/303, 623, 698

[56] References Cited

U.S. PATENT DOCUMENTS

| | | | |
|---|---|---|---|
| 3,792,992 | 2/1974 | Brymer | 65/334 X |
| 4,015,967 | 4/1977 | Ward, Jr. | 65/133 |
| 5,180,413 | 1/1993 | Pinkerton et al. | 65/334 |
| 5,189,934 | 3/1993 | Tintle | 83/623 |
| 5,246,478 | 9/1993 | Yabuki | 65/334 |
| 5,269,828 | 12/1993 | Tijerina-Ramos | 65/334 |

Primary Examiner—Robert L. Lindsay
Attorney, Agent, or Firm—Christie, Parker & Hale

[57] ABSTRACT

Gob-shearing apparatus for providing a predetermined amount of a molten glass article vertically transferred from a feeder bowl which is capable of performing two cutting strokes when a pair of hydraulic cylinders having a rack gear reciprocates, thus obtaining an improved sheared surface of the gob. The apparatus includes a driving pinion engaged with and rotated by the reciprocation, a pair of driven pinion engaged with the driving pinion and rotated by the rotation of the driving pinion, a pair of first links having a blade on its free end, a pair of second, third and fourth links which are linked between the first link and driven pinion for link motion, and a guide rail for guiding the circular movement of the first links.

5 Claims, 3 Drawing Sheets

APPARATUS FOR SHEARING A GOB

BACKGROUND OF THE INVENTION (1) Field of the Invention

The present invention relates to an apparatus for shearing a gob used in forming a funnel/panel of a cathode ray tube and, more particularly, to a shearing apparatus capable of obtaining a uniform sheared surface, an increased shearing speed, and loading a predetermined place of a mould with a gob.

(2) Description of the Prior Art

A molten glass article is pressed and cast in a mould installed under a shearing apparatus to obtain a panel/funnel of a cathode ray tube CRT. FIG. 3 shows, in a schematic view, a device for moulding the panel/funnel of the CRT. A melting container A transfers the molten glass article to a feeder B. The feeder B provides a predetermined amount of the molten glass article with the mould C. A shearing apparatus D between the feeder B and the mould C cuts the molten glass article to load the gob with the mould.

The shearing apparatus D is formed such that a pair of blades moves like scissors at the time of transferring the molten glass article thereto. Since the blade for cutting the molten glass article has a pneumatic cylinder as a driving force, the change of pneumatic pressure changes the speed of a scissors-like movement of the blade, which results in the gob having a nonuniform section.

After completing its stroke, the movement of the blade is temporarily stopped by force by a stopper, so that the movement speed is zero and then the blade returns to its open position. Such a forced stop results in vibrations of the blade at the very time of cutting to obtain the nonuniform section of the gob.

FIG. 4B is a graph illustrating a relation between a gob shearing time and a displacement when a conventional gob-shearing apparatus cuts the molten glass article. If a curved line is bisected, the left part shows the performance of cutting the molten glass article and the right part shows the resuming of the blade after completion of the cutting. The curved lines L1 and L2 indicates the movement of the left and right blades of the gob-shearing apparatus.

As shown in FIG. 4B, points of bends of the L1 and L2 do not agree with each other, which means a formation of the nonuniform section of the gob constitutes a principle factor of not loading the gob with the mould.

This type of shearing apparatus is described in U.S. Pat. No. 4,015,967.

SUMMARY OF THE INVENTION

Therefore, the present invention has been made in an effort to solve the above-described problems of the conventional art.

An object of the present invention is to provide a gob-shearing apparatus for moulding a panel/funnel of a cathode ray tube CRT, which has advantages of increasing productivity and decreasing inferior quality by providing a uniform cut section of a gob.

To achieve the above objects, the present invention provides a gob-shearing apparatus for forming a panel/funnel of the CRT including: a pair of reciprocating means for reciprocating a rack gear whose ends are received in each reciprocating means, respectively, putting each reciprocating means at its side end; a driving pinion engaged with a driven pinion and rotated by the reciprocating rack gear; a pair of driven pinions engaged at a respective one of left and right portions of driving pinions on the basis of its centerline and rotated by the rotation of the driving means; a pair of fourth links coupled to and corated with the respective one of the pair of driven pinions; a pair of third links linked to a respective one of the pair of fourth links for performing a links motion; a pair of second link linked to a respective one of the pair of third links for performing a link motion; a pair of first links having a middle portion linked to a respective one of the end portion, a respective one of the pair of second links for performing a link motion, a side end portion hinged on a supporting member for achieving a circular movement by the link motion, and a free end portion; a pair of cutting means for cutting the molten glass article, the cutting means being mounted on a respective one of the free ends of the pair of fist link; and a guide means for guiding the circular movement of the first links by a roller connecting them to each other.

BRIEF DESCRIPTION OF THE DRAWINGS

The above and further objects, details and advantages of the present invention will become apparent from the following detailed description of a preferred embodiment thereof, when read in conjunction with the accompanying drawings.

DETAILED DESCRIPTION OF THE PRESENT INVENTION

Figure 1:
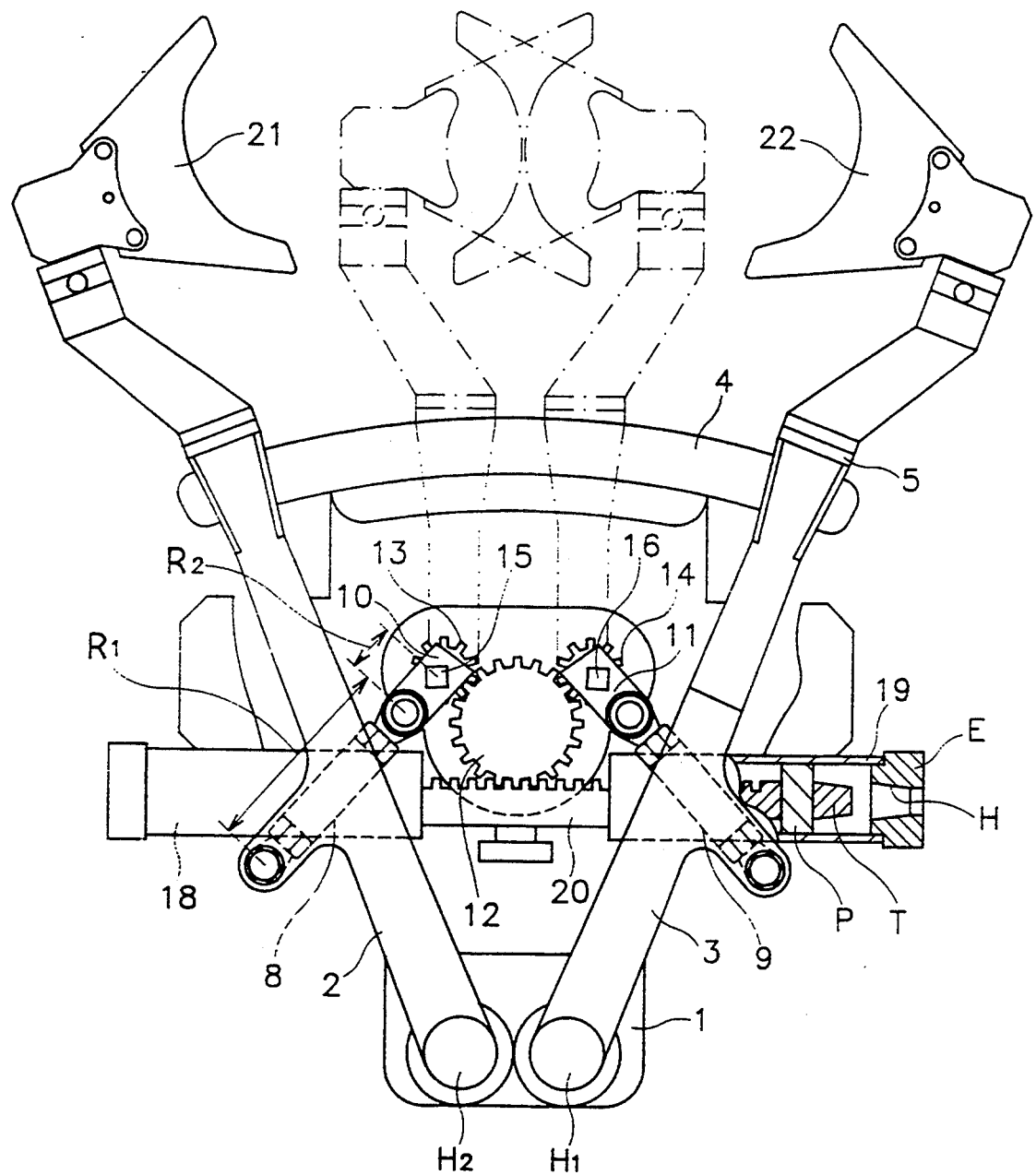
FIG. 1 is a plan view of an apparatus for shearing a gob in accordance with the present invention.
Figure 2:
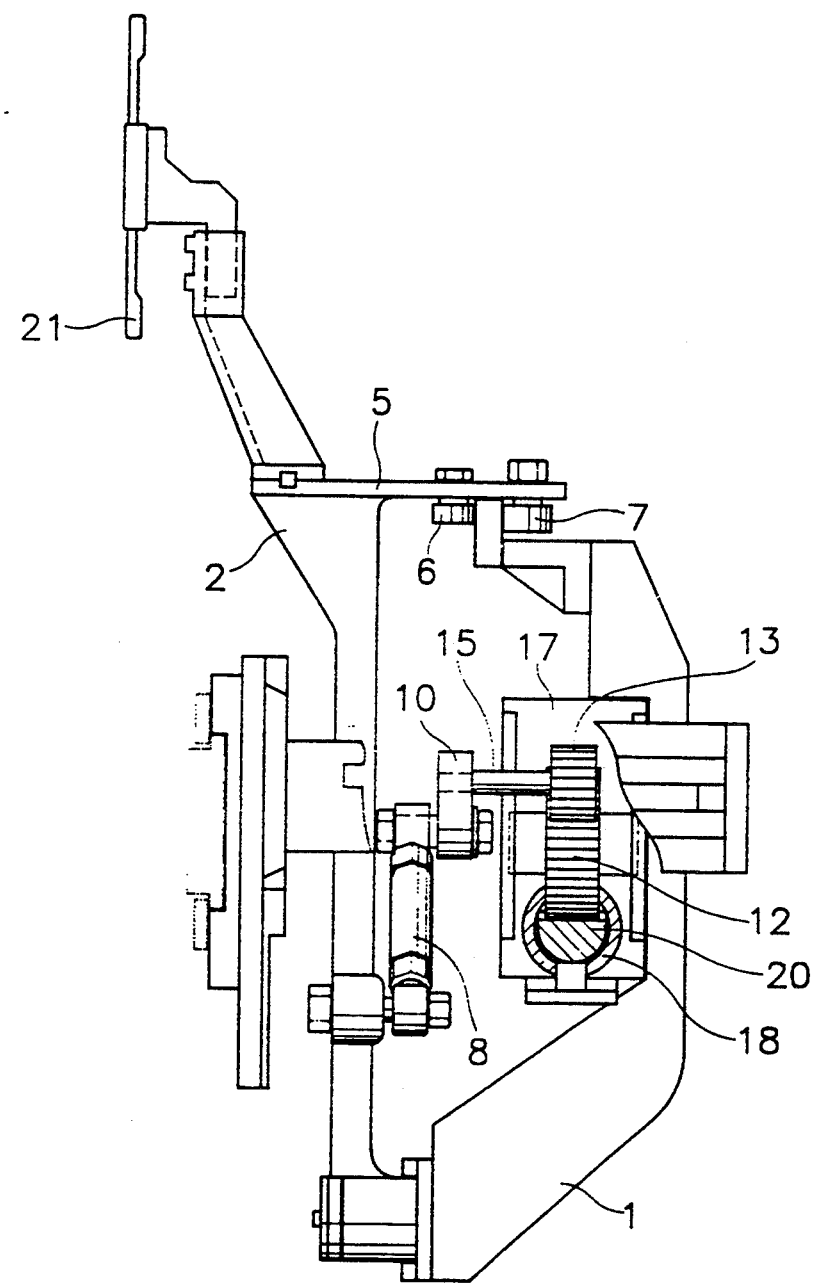
FIG. 2 is an side view of a apparatus for shearing a gob in accordance with the present invention.
Figure 3:
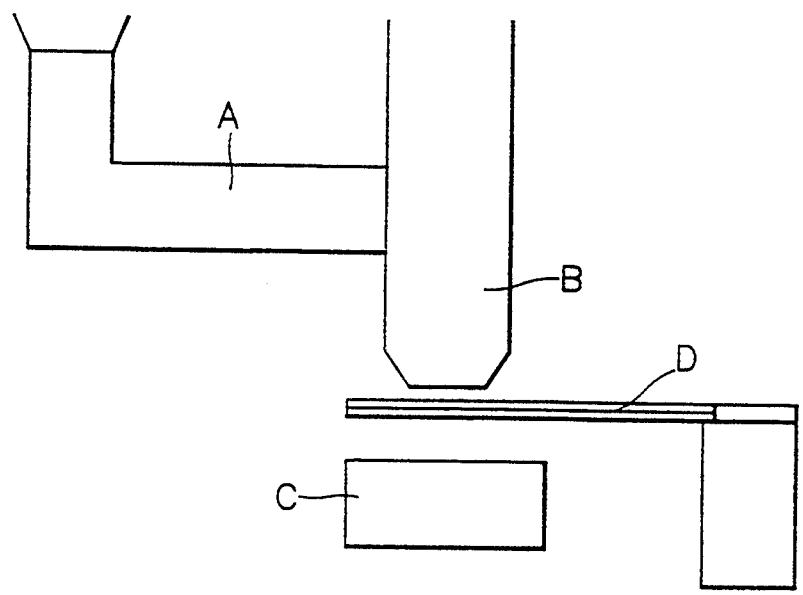
FIG. 3 is a schematic view of a device for forming the panel/funnel of the CRT.

FIGS. 1 and 2 show an apparatus for shearing a gob of the present invention. A pair of first links 2 and 3 is coupled to the side end of supporting member 1 and are circularly moved by means of a hinge. A circular guide rail 4 is mounted on an opposite side end of the supporting member 1 to prevent the links 2 and 3 from swaying when they move.

Since the links 2 and 3 circularly move on the guide rail 4 in a predetermined circular movement, the rail 4 is curved to have the same curvature as that formed by the circular movement.

To couple the first links 2 and 3 to the guide rail 4, a plate 5 is mounted on links 2 and 3 to be fixed thereon. A pair of rollers 6 and 7 is mounted on the front and back of plate such that the links 2 and 3 can slide along the guide rail 4.

One side end of each of a pair of second links 8 and 9 is movably linked to middle portions of a pair of the first links 2 and 3. Another side end each of a pair of second links 8 and 9 is also movably linked to a side end of a pair of third links 10 and 11. Another side end of a pair of third links 10 and 11 is connected with a pair of fourth links 15 and 16. The fourth links are connected to and rotated with a pair of driven pinions 13 and 14. The pair of driven pinions 13 and 14 are engaged with a driving pinion 12.

The pair of driven pinions 13 and 14 are placed at the same angle on the left and right sides of the driving pinion 12 on the basis of its centerline, so that the driven pinions 13 and 14 are installed within gear box 17 to be rotated.

The gear box 17 is fixedly mounted on supporting member 1. The driving pinion 12 is engaged with a rack gear 20 extended to and integrally formed with the front end of the piston rods of two hydraulic cylinders 18 and 19, whereby the driving pinion 12 can be rotated according to the reciprocation of the rack gear 20.

Each hydraulic cylinder 18 and 19 includes the piston rods and the rack gear 20 connecting the piston rods to each other and are arranged adjacent to each other. This arrangement prevents the rack gear 20 from swaying. Further, each outer end of the hydraulic cylinders 18 and 19 has an end cap E having a configuration corresponding to that the outer end of piston P thereby reducing an even vibration to the minimum despite the abrupt variation of the speed. That is, a tapered hole H capable of entering a tapered portion T of the piston P thereto is formed on the end cap E mounted on the outer ends of each hydraulic cylinder, thereby absorbing the vibration caused by the abrupt variation of the speed.

A pair of blades 21 and 22 for cutting the molten glass article is mounted on the free ends of a pair of first links 2 and 3 to face each other. The space between the blades 21 and 22 can be widened or narrowed in accordance with the open and close movement of the first links 2 and 3.

In the gob-shearing apparatus as described above, the molten glass article is transferred from a feeder bowl to a mould and the gob-shearing apparatus starts to operate. Each hydraulic cylinder 18 and 19 moves forward and backward when the blades 21 and 22 open, as shown in FIG. 1. The rack gear 20 moves to the left and then driving pinion 12 engaged with the rack gear can be clockwise rotated, so that each driven pinion 13 and 14 are rotated counterclockwise. Thus, each fourth link 15 and 16 which is rigidly coupled to the middle portion of the two driven pinions 13 and 14, is rotated with the driven pinion.

Thus, each third link 10 and 11 which is connected to each side end of the fourth links 15 and 16 respectively, is rotated in the same rotational direction of each driven pinion 13 and 14. At the same time, it transmits a rotational power to each second link 8 and 9.

The rotational movement of each second link 8 and 9 is transmitted to each first link 2 and 3, respectively. Each first link 2 and 3 is rotated clockwise or counterclockwise centering around each hinge point H1 and H2, respectively.

According to this operation, the blades 21 and 22 mounted on the free ends of the first links 2 and 3 cut the upper portion of the molten glass article descending from the feeder bowl by crossing them with each other.

At this time, each driven pinion is in the half-rotated step. The rack gear 20 is in each half-moved step. The fourth link 15 and 16 is in the step of being rotated at an angle of 180°.

A nominal line, as shown in FIG. 1, illustrates the step of cutting the molten glass article. The rack gear 20 continues to move and then, at each time of completing this movement, the fourth link 15 and 16 is rotated at an angle of 360°.

Further, the rack gear 20 moves to the right as shown in FIG. 1. The driving pinion 12 is rotated counterclockwise, so that each driven pinion is rotated clockwise.

Thus, the molten glass article is cut in the manner of a link motion of rotating clockwise or counterclockwise.

Figure 4A:
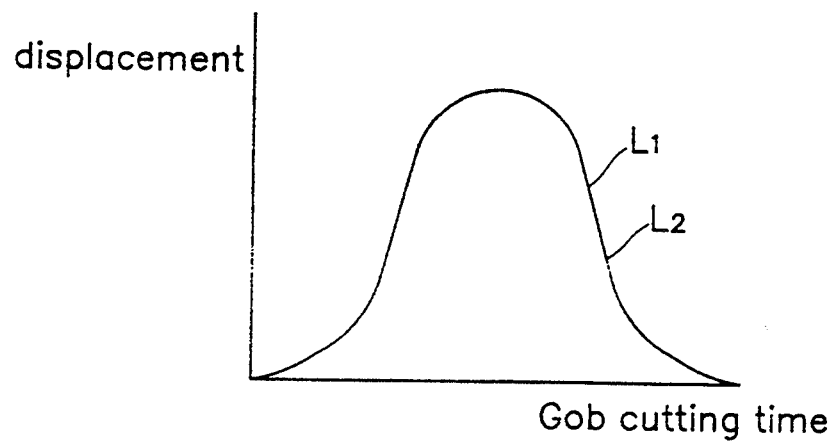
FIG. 4A is a graph illustrating a relation between a gob-cutting time and a displacement at the time of cutting the gob of the apparatus for shearing a gob according to the present invention.
Figure 4B:
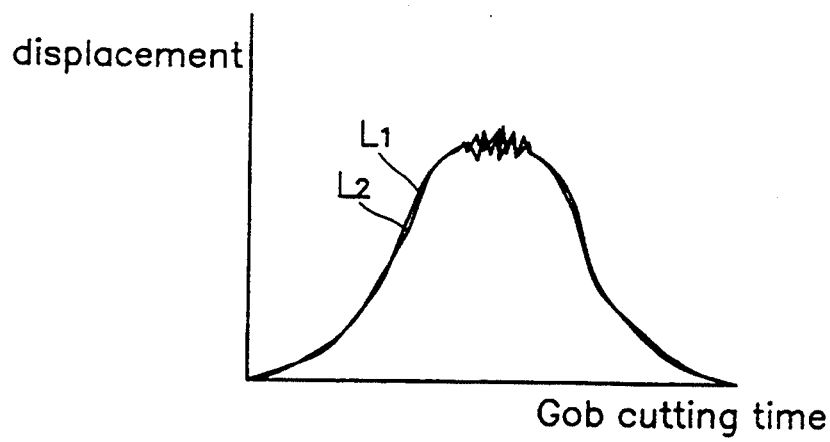
FIG. 4B is a graph illustrating a relation between a gob-cutting time and a displacement at the time of cutting the gob with a conventional gob-shearing apparatus.

FIG. 4A is a graph illustrating a relationship between a gob-shearing time and a displacement at the time of cutting the molten glass article of the gob-shearing apparatus of the present invention. As shown in this figure, a curve L1 shows a movement of the left blade 21 and a curve L2 shows a movement of the right blade. Points of bend of the curves L1 and L2 agree with each other, which show an equal displacement to each other without vibration of each the blades.

Because the gob-shearing apparatus of the present invention changes a rectilinear movement of rack gear 20 into a circular movement, so that, when the driven pinions 13 and 14 are each rotated at an angle of 180, the blades 21 and 22 close to cut the molten glass article, and when the driven pinions 13 and 14 are each rotated at an angle of 360°, the blade opens to complete its stroke. In order to cut the molten glass article at the time of finishing rotation the driven pinions 13 and 14 are at an angle of 180, a length of each link 2, 3, 8, 9, 10, and 11, and a distance between the hinge points H2 and H1 have a predetermined relationship with each other.

Especially, as shown in FIG. 1, a length R1 of the second links 8 and 9 and a length R2 of the third links 10 and 11 have substantial effect on the circular movement of the blades 21 and 22. A computer simulation test shows a ratio of R1 to R2 which is preferably 1 to from 0.15 to 0.56 (1:0.15–0.56).

If R2 is more than 0.56R1, the molten glass article is not symmetrically cut by the shearing apparatus, so that a cutting declination occurs and the gob is not precisely loaded with a predetermined place of the mould.

Otherwise, if the R2 is under 0.15R1, the links are not operate smoothly, so that the third links 8 and 9 considerably wear down.

Thus, the gob shearing apparatus of the present invention has advantages of obtaining a uniform sheared surface by stopping the blades by means of the link motion, an increased shearing speed by cutting the molten glass article during the reciprocation of the rack driven by the hydraulic cylinder, and loading a predetermined place of the mould with the gob.

Although the preferred embodiments of this invention have been described in detail; it should be clearly understood that many variations or modifications of the basic inventive concepts here taught will still fall within the spirit and scope of the present invention, as defined in the appended claims.

What is claimed is:

1. A gob shearing apparatus for providing a predetermined amount of a molten glass article vertically transferred from a feeder bowl comprising:

a pair of hydraulic reciprocating means for reciprocating a rack gear wherein each of opposite ends of the rack gear is received in one of the reciprocating means;

a driving pinion engaged with and rotated by the reciprocation of the rack gear;

a pair of driven pinions engaged with the driving pinion and rotated by the rotation of the driving pinion;

a pair of fourth links coupled to and co-rotated with a respective one of the pair of driven pinions;

a pair of third links linked to a respective one of the pair of fourth links for performing a link motion;

a pair of second links linked to a respective one of the pair of third links for performing a link motion;

a pair of first links having a middle portion linked to a respective one of the pair of second links for performing a link motion, a side end hinged on a supporting member for achieving a circular movement by the link motion, and a free end portion;

a pair of cutting means for cutting the molten glass article, the cutting means being mounted on a respective one of the free ends of the pair of first links; and a guide means for guiding the circular movement of the first links.

2. A gob-shearing apparatus as claimed in claim 1 wherein the pair of driven pinion is symmetrically engaged at the respective one of the left and right portions of driving pinion on the basis of its centerline and is rotated by the rotation of the driving pinion.

3. A gob-shearing apparatus as claimed in claim 1 wherein a ratio of the link motion length of the second link to the link motion length of the third links is 1:0.15 to 0.56.

4. A gob-shearing apparatus as claimed in claim 1 wherein each of the hydraulic reciprocating means further comprises a piston having a tapered portion and an end cap, mounted on the outer end of the cylinder, the end cap forming a hole having a configuration corresponding to that of the tapered portion of the piston for reducing vibration to the minimum despite the abrupt variation of the speed.

5. A gob-shearing apparatus as claimed in claim 1 wherein each of the first links mounts a plate on its free end, the plate mounting a pair of rollers on its front and back to slide along the guide member.

* * * * *